US008491059B2

(12) United States Patent
Smith

(10) Patent No.: US 8,491,059 B2

(45) Date of Patent: Jul. 23, 2013

(54) ADD-ON DUMP RACK APPARATUS FOR PICKUP TRUCK

(76) Inventor: Gene A. Smith, Shallotte, NC (US)

( * ) Notice: Subject to any disclaimer, the term of this patent is extended or adjusted under 35 U.S.C. 154(b) by 438 days.

(21) Appl. No.: 12/214,530

(22) Filed: Jun. 19, 2008

(65) Prior Publication Data

US 2009/0315387 A1 Dec. 24, 2009

(51) Int. Cl.
*B60P 1/16* (2006.01)

(52) U.S. Cl.
USPC .......... 298/1 A

(58) Field of Classification Search
USPC .......... 298/22 P, 1 A, 18, 17.5, 17.6, 17.7, 298/1 B, 1 R, 1, 11; 414/495
See application file for complete search history.

(56) References Cited

U.S. PATENT DOCUMENTS 3,471,045 A 10/1969 Panciocco .......... 214/83.24
3,833,261 A * 9/1974 Dingler .......... 298/1 A
3,871,706 A * 3/1975 Odom .......... 298/1 A
4,568,239 A * 2/1986 Sims .......... 414/809
4,647,110 A * 3/1987 McKee .......... 298/1 A
4,877,108 A 10/1989 Griffin et al. .......... 182/68
5,580,134 A * 12/1996 Allwine .......... 298/11
5,836,657 A * 11/1998 Tilley et al. .......... 298/1 A
5,868,453 A * 2/1999 Steigner .......... 296/100.1
6,196,634 B1 * 3/2001 Jurinek .......... 298/1 A
6,439,667 B1 * 8/2002 Weets et al. .......... 298/11
6,676,220 B2 1/2004 Mistler .......... 298/1 A
7,137,479 B2 11/2006 Ziaylek et al. .......... 182/127
2006/0182573 A1 8/2006 Taylor .......... 414/477
2007/0258800 A1 11/2007 Mistler .......... 414/408

* cited by examiner

*Primary Examiner* — Glenn Dayoan
*Assistant Examiner* — Sunsurraye Westbrook
(74) *Attorney, Agent, or Firm* — Michael E. Mauney

(57) ABSTRACT

A pivoting dump rack for an existing pickup truck. The pivoting dump rack is mounted on pivot mounts with a single axis above the tailgate end of an existing pickup truck bed. On each rail of the pickup truck bed a hydraulic lift is mounted on a support frame. The hydraulic lifts raise the rack while the support frame distributes the load on the hydraulic lifts as they are in use. The rack is long enough to extend from the tailgate to above the cab of the pickup truck while providing extensions mounted on each end of the rack to further lengthen the pivoting rack and to increase the length of loads that can be carried by the pivoting rack. An attachable dump bed may also be fitted on the pivoting rack to allow it to carry loose items such as dirt and construction debris.

7 Claims, 5 Drawing Sheets

10
100
120
100
800
120
320
155
310
300
500
150

100
10
120
120
125
125
200
300
155
150
500

10
100

120
500

101
101A
100
105
106

101

101A
100
106
105
150

10
100
100
155
150
120
120
320
310
300
500
800

ADD-ON DUMP RACK APPARATUS FOR PICKUP TRUCK

FIELD OF THE INVENTION

This invention relates generally to an accessory apparatus for attachment to an existing pickup truck to carry and unload unusual size or unusual weight loads using a single axis pivot point hydraulic dump rack.

BACKGROUND OF THE INVENTION

Various types of construction workers including painters, electricians, carpenters, general contractors, as well as other laborers including farmers and mechanics use a pickup truck. The utility of the truck is that the bed of the truck provides storage and transportation of unusually sized items that would not fit within an enclosed structure like a car or a van. Some types of specialized racks are designed for trucks to carry long items such as ladders, pipes, siding, and reenforcing bars. Typically, these truck accessories take the form of a stationary frame attached to the side rails of the bed of a truck or trailer. Some of these are attached solely to the side rails of a pickup truck bed with appropriate attachments for such items as ladders or the like. Under other circumstances there may be cross members that run laterally above the bed of the pickup truck approximately the height of the side rails, connecting one side rail rack to another side rail rack. Lateral members make the possibility of carrying longer items above the bed of the pickup truck by resting them on the lateral members. Whatever may be carried in these racks may be secured using ropes, elastic cords, chains, or other usual attaching devices. In most circumstances, items that are carried in this fashion, whether they are ladders, plastic pipe, or lumber, are lifted into place by a user and placed on the rack for transport, then when the user has arrived at the point necessary to use the stored item, they are then lifted out of the rack to where they are needed to be used.

While these racks have significant utility, they also have significant shortcomings. First, depending on how the rack is constructed, there is a limit as to the length of items that can be stored on a rack since most states have laws that limit the amount an item may extend behind a vehicle because of the danger created by a pipe or pole extending beyond the lift gate of a pickup truck. This is especially true where the rack is at the level of the pickup truck side walls since an extending item would basically protrude into the windshield or passenger area of a passenger car coming behind the truck carrying such an item. Secondly, these racks have limited utility for heavy items since a heavy item may require more than one person to remove the item from the rack on which it is stored.

There are expedients that have been employed to overcome some of these shortcomings. For example, Mistler, U.S. Pat. No. 6,676,220, discloses a pivoting rack attachment to the side rails and bed of a pickup truck. Mistler employs a specially designed pivoting frame employing four sections. At the part of the Mistler rack closest to the tailgate of the truck, there are a pair of rear pivoting legs to pivot from a vertical position to a horizontal position as the dump rack itself goes from a neutral or horizontal position to an inclined vertical position. Mistier has a two-pivot point dump rack disclosed in U.S. Publication #2007/0258800, which again employs a hydraulic lift on the bed of the truck using two pivots points to pivot a dump rack. Steiger, U.S. Pat. No. 5,868,453, discloses a truck bed security system and also pivots to dump a load carried on the platform (23). The platform (23) of the Steiger '453 patent completely covers the bed of the truck and when the rack is in the horizontal position, this secures the dump bed or bed of the pickup truck. Steiger, like Mistler, employs a rotatable hydraulic arm on the bed of the truck to raise and lower the rack. Despite this earlier work there is still a need for a simple and practical dump rack that can be built at a reasonable price, is not unduly complex to build or to operate, which does not obstruct the bed of the pickup truck from use concurrently with or in addition to the dump rack, and can be employed to carry oversized loads.

The current invention employs a single pivot axis for a dump rack mounted on the side rails of a pickup truck. This pivot axis is in close proximity to the end of the side rail distal from the cab of the truck and proximal to the tailgate. At a predetermined distance from the pivot axis, two single arm hydraulic lift mechanisms are employed. One end of each hydraulic lift mechanism is mounted at the approximate level of the upper portion of the side rail of the pickup truck. The opposite end of each hydraulic lift mechanism is mounted on the under side of the upper rail of the dump rack. The dump rack itself is positioned on a support mounted on the side rail of the pickup truck. The dump rack of this invention extends all the way to and above the cab of the pickup truck. It provides that extremely long items may be mounted to extend in front of the front bumper of the pickup truck and may also extend beyond the rear bumper of the pickup truck, providing the capability of carrying items substantially in excess of 35 feet, while still staying within the limitations on overhanging items imposed by most highway safety rules. In order to effectively lift the dump rack to an angle so that it will be able to dump long items, it is necessary that the hydraulic lift be mounted at or near the height of the side rail unless a complex and expensive telescoping hydraulic lift is employed. A generally rectangular bed-like container may be removably fixed or permanently fixed within the rack, so that loose items, debris, soil, construction refuse and the like can be carried and dumped using the hydraulic lifts. Some construction sites require relatively timber large crossbeams. These timber beams can range to up to 35 feet in length. These will not fit within an ordinary bed of a dump truck. Consequently, a much larger truck must be employed to move them from the lumber yard or other point of purchase to the point of construction. These large trucks may create problems on small residential streets or in driveways. Consequently, if a regular pickup truck could be employed to carry and unload these long, heavy timber beams it would be a substantial advance in the art. This and other advantages of this invention will be more apparent from the Detailed Description of the Drawings which follows.

DETAILED DESCRIPTION OF THE DRAWINGS

Figure 1:
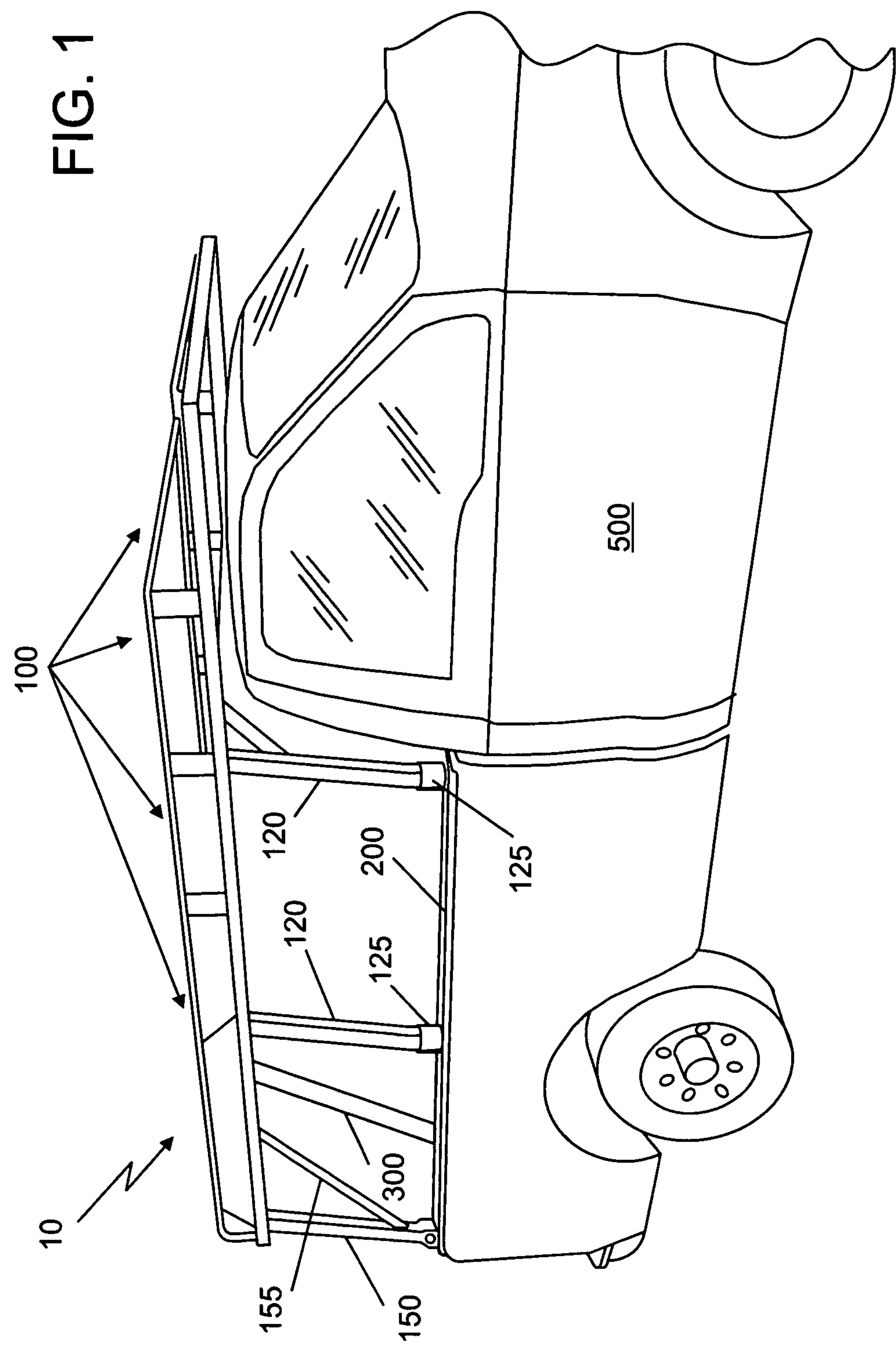
FIG. 1 shows a partial prospective side view of the current invention in the resting or lateral position.
Figure 3:
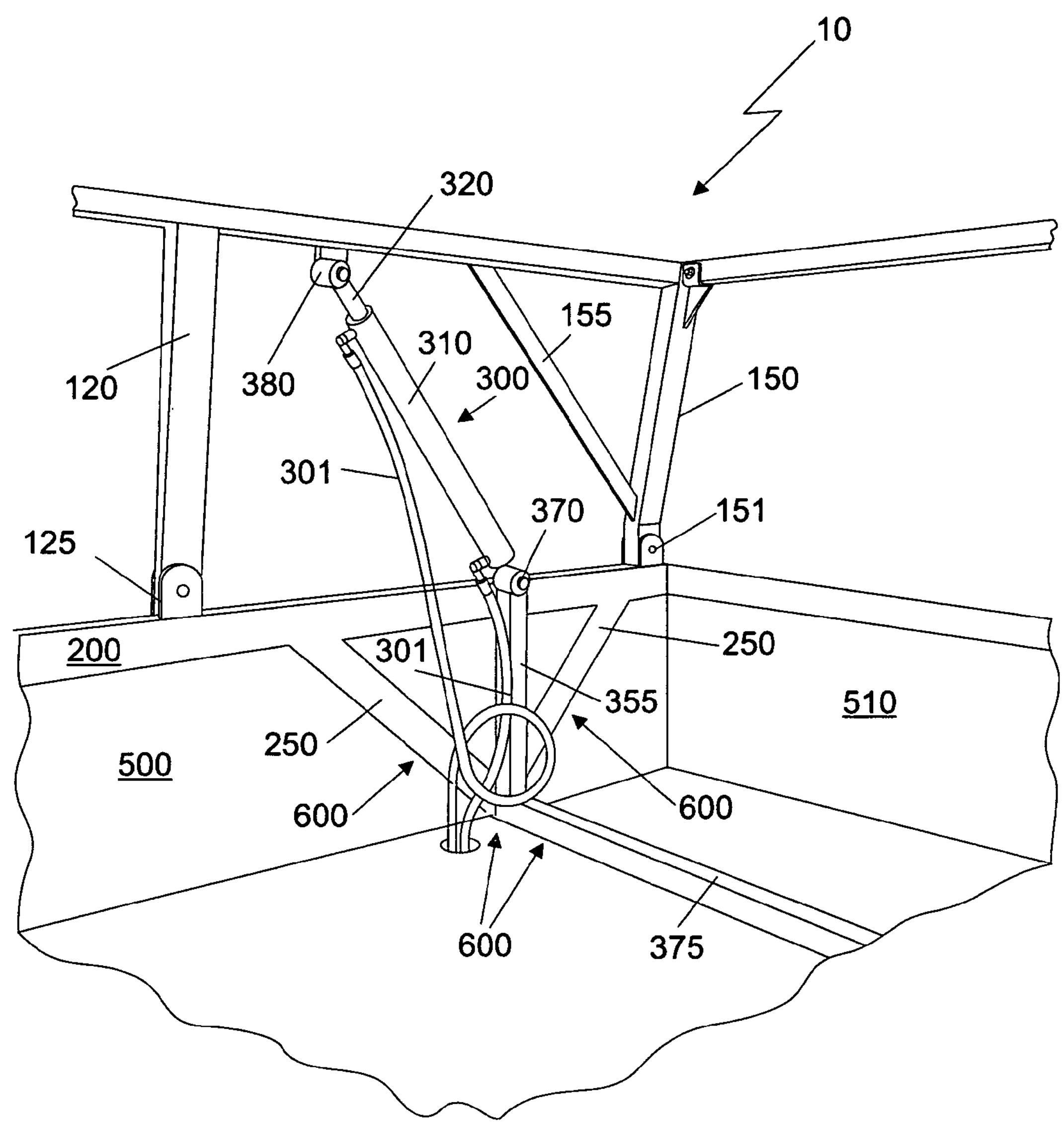
FIG. 3 shows a detailed view of the support for the hydraulic lifts.

FIG. 1 shows the dump rack (10) as seen from the passenger side of a pickup truck (500). For simplicity, this view only shows the passenger side of the dump rack (10). A support rail (200) is fixed along the top of the side rail of the pickup truck (500) bed. The support rack (100) is seen positioned above the cab of the pickup truck (500) and extending to the pickup truck (500) tailgate. In this view, two support legs (120) are attached to the support rail (200). The attaching guide (125) secures the support legs (120) in place, prevents lateral movement and allows the support legs (120) to be fixed in place using a pin, lock or similar device. The support legs (120) set on an attaching guide (125) which is fixed to the support rail (200). The support legs (120) rest in and are supported by the support rail (200). The support rail (200) serves to distribute weight carried by the support legs (120) along the entire length of the support rail (200) and hence, along the entire length of the side rail of the pickup truck (500). At the end of the dump rack (10) that is proximal to the end of the pickup truck (500) is a pivot leg (150). The pivot leg (150) rests on and is supported by the support rail (200) and is mounted for rotatable movement. A hydraulic lift (300) is mounted to weight distribution frame (600) as seen in FIG. 3. A cross brace (155) extends from the pivot leg (150) to the support rack (100).

Figure 2:
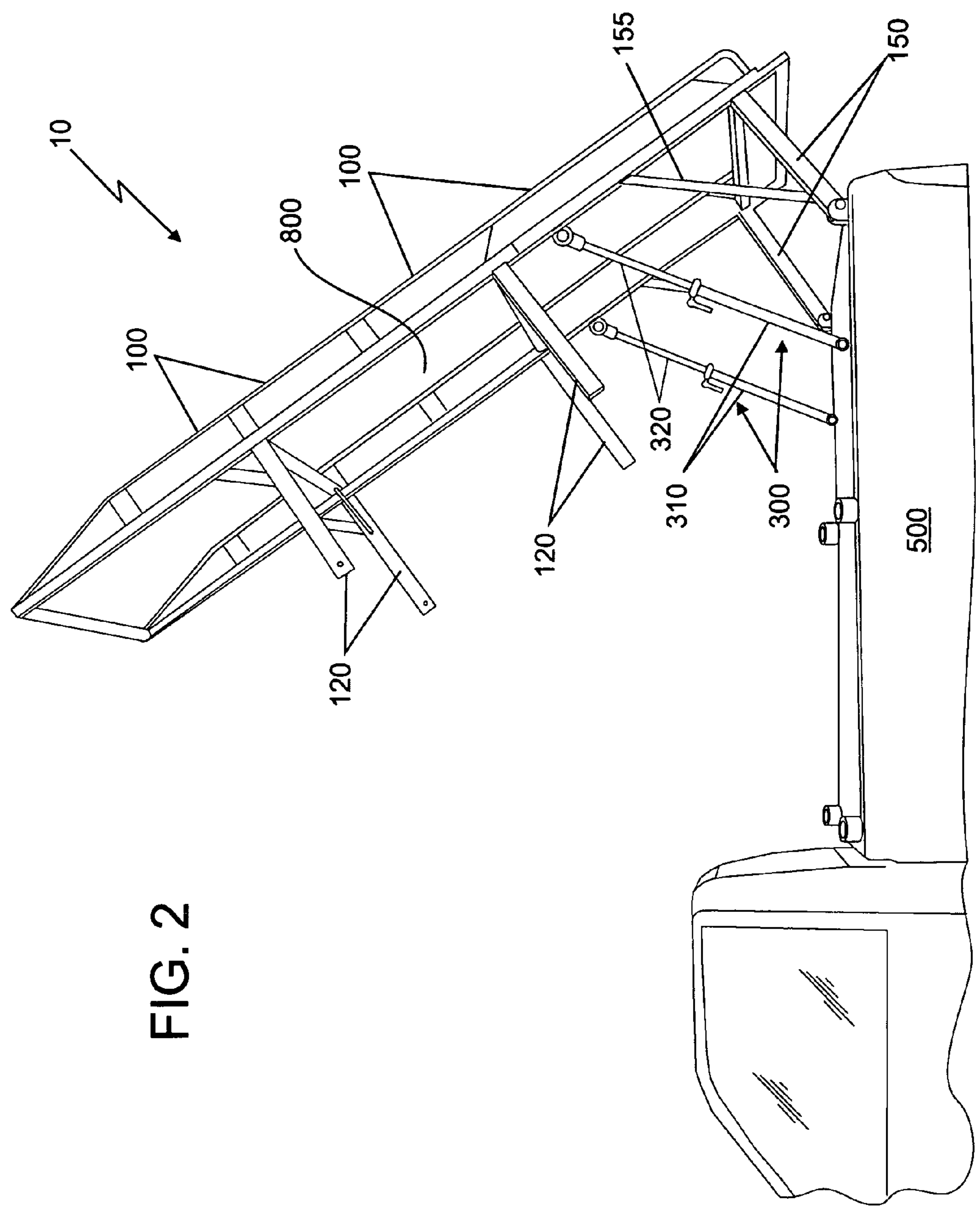
FIG. 2 shows the dump rack in a raised position.

FIG. 2 shows the dump rack (10) in an elevated dump position. Items supported on the dump rack (10) would slide off the tail end of the dump rack (10) by force of gravity. The hydraulic lifts (300) are shown with the hydraulic cylinders (310) in a slightly rotated position with the hydraulic pistons (320) fully extended raising the support rack (100) to a vertical angle of greater than 45°. For an effective dump, the support rack (100) will be raised to a sufficient angle to the horizontal so that items supported on the support rack (100) will slide off the support rack (100) to the ground behind the pickup truck (500) because of gravity. FIG. 2 shows the symmetrical construction of the dump rack (10). The support legs (120) are shown on the driver's side and have a matching support legs (120) on the passenger side of the pickup truck (500). There are matching cross braces (155) and pivot legs (150) on each side of the dump rack. To have the dump rack (10) elevated and rotated to an angle sufficient for gravity to dump loads off the dump rack (10) creates design issues unmet by previous designs. It can be easily seen from FIG. 2 that if the hydraulic lifts (300) are located near the cab in the truck (500), the lifts (300) will require a large rotation and long lift to elevate the dump rack (10) to an effective angle. However, placing the hydraulic lifts (300) near the tail end of the pickup truck (500) places an extra load on the hydraulic lifts (300). The tail location of the lifts (300) places them on the short end of the lever created by the pivot axis for support rack (100). Thus, a tail end location for the hydraulic lift (300) requires more force to lift the support rack (100). By placing the hydraulic lifts (300) near the tailgate or tail end of the pickup truck (500), the extra force required mandates using one large hydraulic lift (300) or two regular hydraulic lifts (300) as shown in FIG. 2 for the dump rack (10). However, locating the hydraulic lifts (300) near the tail end of the truck (500) and having a single pivot axis, essentially over the tail end of the truck (500), allows use of dual, standard, hydraulic single piston lifts (300) if properly mounted. A single multi-piston telescoping hydraulic lift could be employed, as shown in Steiger U.S. Pat. No. 5,868,453, if mounted in the bed of the truck (500). This bed mounted design is undesirable for two reasons. First, a multi-piston telescoping lift is more expensive than standard lifts employing a single piston. Second, the mounting on the floor of the truck bed (500) blocks use of the bed for items like sheets of plywood or similar construction materials.

FIG. 3 shows the dump rack (10) and weight distribution frame (600) in a detail view from the inside of the pickup truck (500) bed looking toward the passenger side of the dump rack (10) as well as a portion of the rear end of the dump rack (10). In this view one sees the pickup truck (500) bed side of the support rail (200) as it rests on the side rail of the bed of the pickup truck (500). One support leg (120) is seen mounted in the attaching guide (125) on top of the support rail (200), then extending to and supporting the support rack (100). The diagonal brace (155) reaches from the support rack (100) to the pivot leg (150) which is on the pivot leg mount (151). The pivot leg mount (151) allows the pivot leg (150) to pivot around an axis mounted in the pivot leg mount (151). Not seen in this view is the matching construction on the driver's side of the pickup truck (500) bed. However, there is a matching pivot leg (150) and pivot leg mounting (151) unseen in this view on the driver's side of the pickup truck bed (500). The symmetrical construction causes each pivot leg (150) to pivot around a single axis, hence there is a single symmetrical pivot point to each side of the pickup truck (500) side rails. The weight distribution frame (600) supports and distributes weight on the hydraulic lift (300) One hydraulic lift (300) is mounted on a vertical hydraulic lift support (355). There is a V-shaped cross brace (250) which adds extra support to the support rail (200). The V-shaped cross brace (250) and the hydraulic lift vertical support (355) are mounted to a lateral brace (375) which extends across the bed of the pickup truck (500) to the matching structures on the driver's side of the pickup truck (500). Each hydraulic lift (300) has a hydraulic cylinder (310), and piston (320), here shown in a fully retracted position. Hydraulic lift (300) is pivotally mounted on the vertical hydraulic lift support (355) by the pivot mount (370). As piston (320) extends, raising the dump rack (10) in the air, the dump rack (10) pivots on the pivot mounts (151) for the pivot legs (150). The hydraulic lift (300) begins to rotate in a clockwise direction requiring pivot mounts (370) and (380) respectively at the hydraulic cylinder (310) end and piston (320) end of the hydraulic lift (300). Hydraulic fluid hoses (301) are attached appropriately to the hydraulic lift (300) to either allow hydraulic fluid into the hydraulic lift (300) or to evacuate hydraulic fluid from the hydraulic lift (300). V-shaped cross brace (250), with the lateral support beam (375), and hydraulic lift vertical support (355) constitute the weight distribution frame (600) and distributes the load placed on the pickup truck (500) by the rotation and lifting of the dump rack (10). Because of the location of the hydraulic lift (300) in proximity to the tailgate (510) of the pickup truck (500) the amount of weight created by the lifting of the dump rack (10) causes a lever effect requiring special bracing to distribute the load of the pickup truck (500). It is necessary that the weight distribution frame (600) be mounted in proximity to the rear axle of the pickup truck (500).

Figure 4:
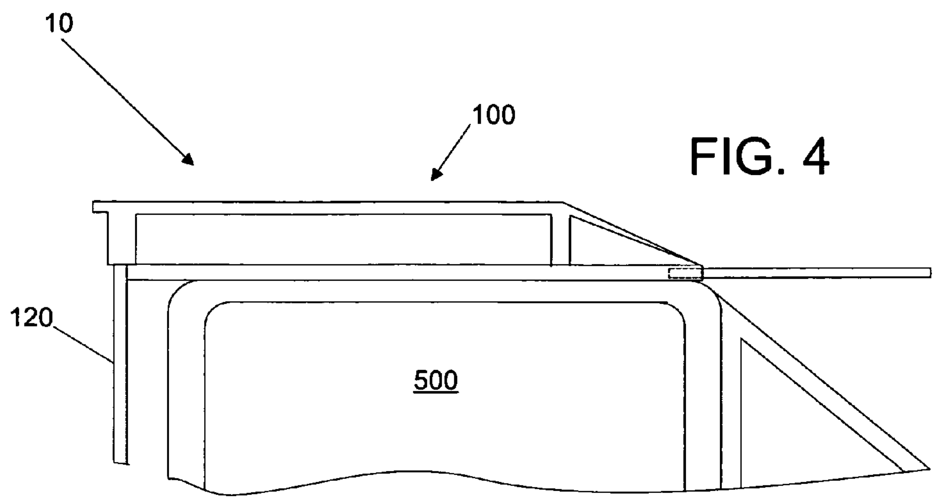
FIG. 4, FIG. 4A and FIG. 4B shows a dump rack extender.
Figure 4A:
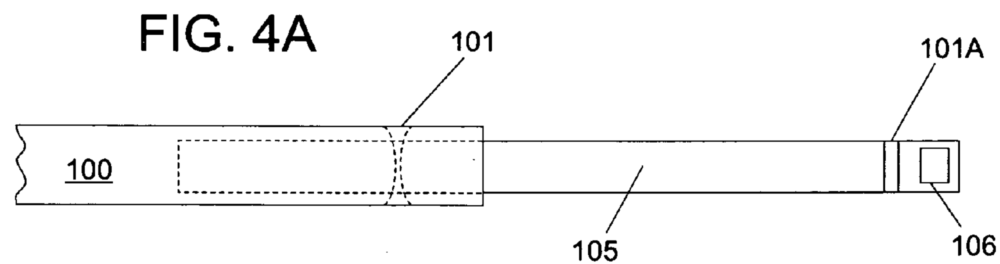
Figure 4B:
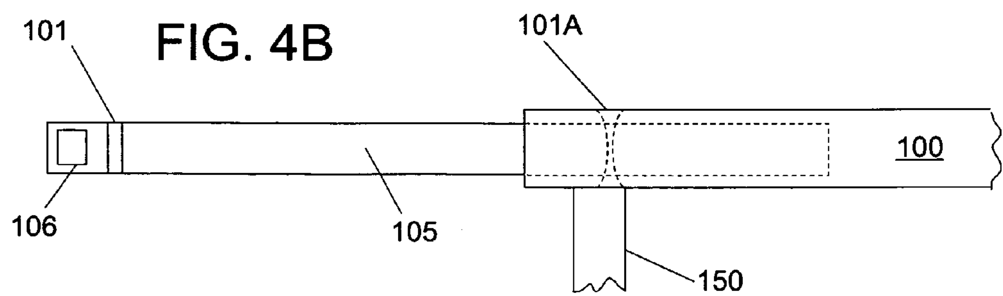

FIG. 4 shows a portion of the cab of the pickup truck (500), the dump rack (10), and of the support rack (100) at the cab end of the pickup truck (500). In order to be able to support long, flexible items that may extend beyond the support rack (100), a telescoping dump rack extender (105) will fit with the support rack (100) at the cab end and tailgate end of the pickup truck (500). This will be secured in place when not in use in the support rack (100) by any convenient means. FIG. 4A shows the cab end extender (105) with a support rack securing opening (101) with a matching dump rack extender (105) opening (101A). A cotter pin can be placed through the openings (101 and 101A) when the dump rack extender (105) is retracted and the openings (101), and 101A) are aligned with each other. It may be understood that this dump rack extender (105) is a symmetrical construction extending both from the passenger and driver side of the support rack (100) and that a horizontal crossbar (106) will extend from one side of the support rack (100) to the other side of the support rack (100) to provide support for lengthy items that are resting on the dump rack extender (105). FIG. 4B shows similar extender (105) placed at the tailgate end of the support rack (100) to support items which may need to extend beyond the tailgate of the pickup truck (500). It will be readily appreciated the dump rack extender (105) can be extended several feet from each end of the support rack (100) to make it possible for relatively long but flexible items like PVC pipe to be secured in the support rack (100).

Figure 5:
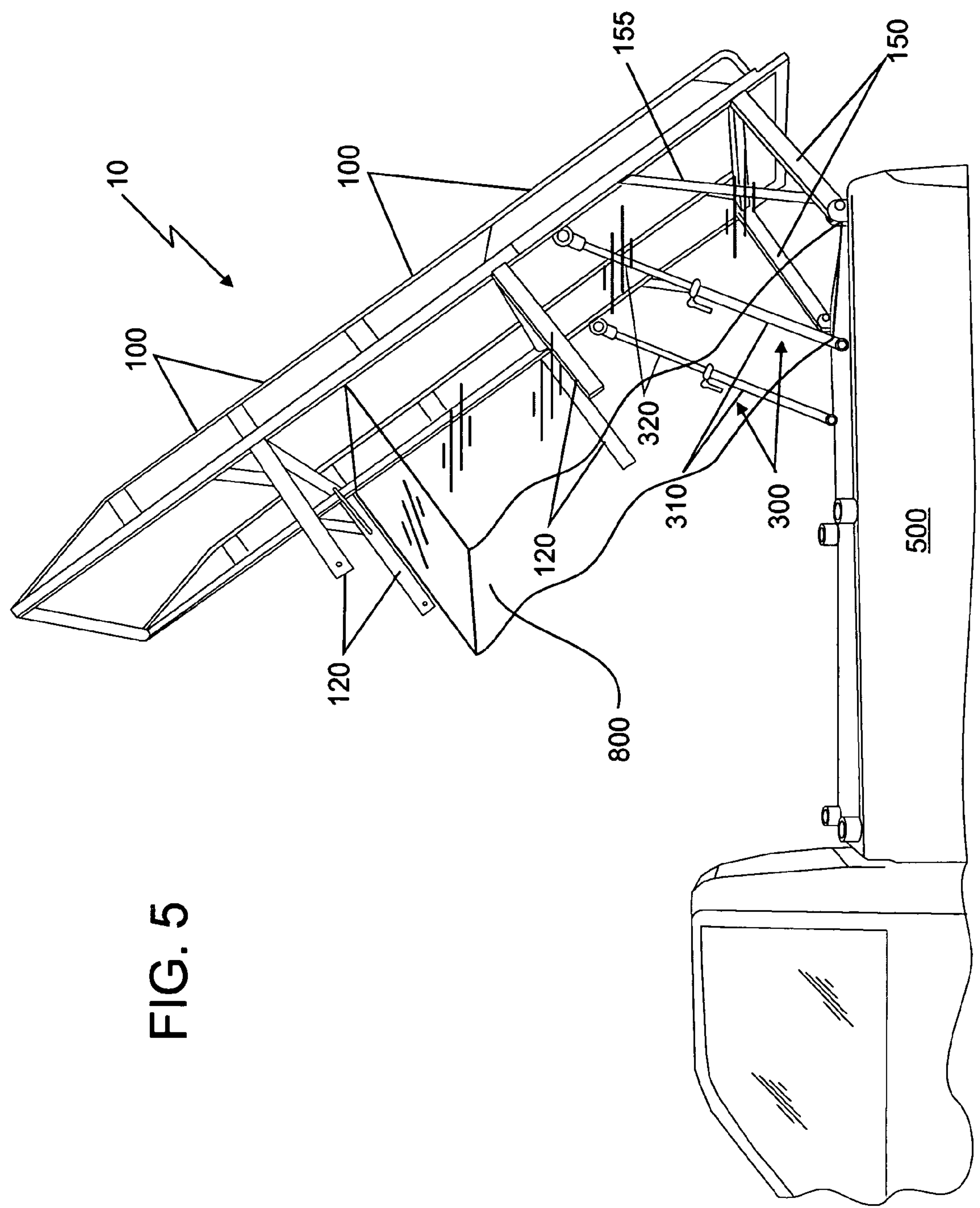
FIG. 5 shows a generally rectangular dump bed.

FIG. 5 shows a dump bed (800) accessory, which could be attached to the dump rack (10). Many construction sites or other jobs require the carrying of many small loose items. These can be debris, left over small pieces of wood, materials from demolition from a portion of a building, landscaping materials, including dirt or mulch. These materials need to be secured within a dump bed (800) for transportation to a construction site to a waste disposal site or from a central area such as a landscaping or garden supply to a construction site. It can be readily appreciated that a dump bed (800) could be attached to the dump rack (10). It can be attached below the level of the support rack (10) and extend near or into the pickup truck bed (500). Ordinarily, the dimensions of the dump rack (10) will be determined by a particular application. In most applications, the dump bed (800) will fit entirely within the overall construction of the dump rack (10)—that is, it will not be any greater in depth than the length of the support legs (120) and the pivot legs (150) but it will remain suspended above the pickup truck bed (500) at or slightly above the side rails of the pickup truck bed (500). The special utility of the design of having twin hydraulic lifts (300) mounted in proximity of the pivot legs (150) and the tailgate end of the pickup truck (500) becomes more readily apparent. Here a standard hydraulic lift (300) can create enough of a vertical lift on the dump rack (10) to create an effectively steep angle so that loose items secured within the dump bed (800) will be forced by gravity to slide down the dump bed (800) and off the back of the bed of the pickup truck (500). For items such as lumber, ladders, or pipe that might be secured on top of the support rack (100) an angle of 45° may be sufficient to enable a user to slide these items off the support rack (100). However, because of friction, to effectively dump a load of mulch, topsoil, or small loose items of debris an angle greater than 45° needs to be created by the hydraulic lifts (300) when raising the dump rack (10) and the dump bed (800). By mounting the hydraulic lifts (300) on the side rails of the pickup truck using support rails (200) and weight distribution frame (600). Ordinarily, two hydraulic lifts (300) can create enough of an angle to effectively empty the dump bed (800) when it is filled even with relatively difficult items to dump such as topsoil or mulch.

It will be readily apparent to one of ordinary skill in the art that common design features such as the hydraulic lifts or control of the hydraulic lifts and attachment guides securing the dump rack to the pickup truck may be readily varied without changing the essential inventive concept described herein. The foregoing description is by way of example only and not by way of limitation. The only limitations are in the claims which follow.

I claim:

1. For a conventional pickup truck with a passenger cab at a first end and an open load bed behind said cab extending to a second tailgate end, an improvement comprising:

(a) a support rack, attachable to said pickup truck on and above side rails of said load bed of said pickup truck;

(b) for said support rack a plurality of fixedly mounted at a predetermined angle support legs extending from said support rack to said side rails;

(c) at said second tailgate end of said existing pickup truck bed and distal from a cab end, pivot mounts on each side rail of said pickup truck;

(d) two pivot legs extending from said support rack to said pivot mounts and said two pivot legs rotates around a single axis of rotation in said pivot mounts thereby allowing said support rack to be raised from said resting position to a predetermined angle;

(e) a support frame distal from a cab end and in proximity to said pivot mounts and said second tailgate end, but between said pivot mounts and cab of said pickup truck, said support frame for distributing a load placed on said support frame across bed of said pickup truck without obstructing said bed of said pickup truck;

(f) on said support frame, hydraulic lift means for said support rack to raise said support rack from a resting position parallel to said bed of said pickup truck to a raised position at a predetermined angle to resting position of said support rack wherein said hydraulic lift means mounts on said support frame at an upper edge of said side rails of said load bed of said pickup truck whereby said hydraulic lift means may be single piston standard hydraulic lifts to raise said support rack to an angle greater than 45°.

2. For a conventional pickup truck with a passenger cab at a first end and an open load bed behind said cab extending to a second tailgate end, an improvement of claim 1 wherein said support rack extends above the cab on said pickup truck whereby said support rack can support articles longer than the load bed of said pickup truck.

3. For a conventional pickup truck with a passenger cab at a first end and an open load bed behind said cab extending to a second tailgate end, an improvement of claim 2 further comprising on each side rail of said pickup truck a support rail attached on each of said side rails, said support rail supporting said support legs and pivot mounts and distributing load of said support rack on said side rails of said pickup truck.

4. For a conventional pickup truck with a passenger cab at a first end and an open load bed behind said cab extending to a second tailgate end, an improvement of claim 3 wherein each of said support rails have at least one means for detachably securing said support legs to said support rail whereby in transit said support rack is held in place by said means for attaching but when necessary said support legs can be detached from said means for attaching whereby said support rack is then free to be raised from resting position to a raised position.

5. For a conventional pickup truck with a passenger cab at a first end and an open load bed behind said cab extending to a second tailgate end, an improvement of claim 4 further comprising an attachable dump bed to attach to said dump rack wherein said dump bed is positioned on said dump rack but above said pickup truck bed whereby loose items may be carried and supported in said dump bed and then dumped from said dump bed using said hydraulic lift means.

6. For a conventional pickup truck with a passenger cab at a first end and an open load bed behind said cab extending to a second tailgate end, an improvement of claim 5 wherein said support rack has at a least one end of said support rack an extension slidably mounted in said support rack to extend support rack whereby said support rack may support longer items.

7. For a conventional pickup truck with a passenger cab at a first end and an open load bed behind said cab extending to a second tailgate, an improvement of claim 6 wherein said support rack has extensions mounted at a cab end of said support rack and at a tailgate end of said support rack where said extensions will extend said support rack so that it is longer than the length of the pickup truck from said second tailgate end to an engine side of said cab.

* * * * *